United States Patent [19]
Koketsu

[11] Patent Number: 5,236,477
[45] Date of Patent: Aug. 17, 1993

[54] MICROCOMPUTER-BASED CONTROL DEVICE

[75] Inventor: Tadaaki Koketsu, Gifu, Japan

[73] Assignee: Kabushiki Kaisha Toshiba, Kawasaki, Japan

[21] Appl. No.: 965,744

[22] Filed: Oct. 23, 1992

[30] Foreign Application Priority Data

Nov. 5, 1991 [JP] Japan .................................. 3-288163
Dec. 10, 1991 [JP] Japan .................................. 3-325582

[51] Int. Cl.$^5$ ...................... B01D 19/00; G05D 23/00
[52] U.S. Cl. ........................................ 55/274; 236/94; 364/569
[58] Field of Search .................... 236/94; 55/271, 274; 364/569; 165/11.1

[56] References Cited

U.S. PATENT DOCUMENTS

5,019,996 5/1991 Lee ........................................ 364/483
5,131,932 7/1992 Glucksman ............................ 55/274

FOREIGN PATENT DOCUMENTS

0052347 3/1987 Japan ..................................... 236/94
0280534 12/1987 Japan ..................................... 236/94

Primary Examiner—William E. Wayner
Attorney, Agent, or Firm—Limbach & Limbach

[57] ABSTRACT

A microcomputer-based control device for an air conditioner to which a replaceable air filter is attached includes a DC power supply section for converting an AC voltage to a DC voltage, an air-conditioning control unit connected to the DC power supply and including a microcomputer, a control unit resetting circuit for delivering an initial reset signal to the control unit when a voltage to be supplied to the control unit from the DC power supply section has risen to a value at which the control unit is operable, an operation section connected to the air-conditioning control unit for setting an operating condition of the control unit, a non-volatile memory connected to the control unit so that data of a cumulative air conditioning operation time period stored in the control unit is written into and read out of the non-volatile memory, a display for displaying an image indicative of a replacing time of the air filter when the cumulated air conditioning operation time period has reached a predetermined time period, and a voltage drop detector connected between the control unit and the DC power supply section for detecting the output voltage of the DC power supply section dropped to a predetermined level or below to deliver a data write command signal to the control unit so that it is operated in response to the data write command signal to write the data into the non-volatile memory.

2 Claims, 4 Drawing Sheets

MICROCOMPUTER-BASED CONTROL DEVICE

BACKGROUND OF THE INVENTION

1. Field of the Invention

This invention relates to a microcomputer-based control device incorporated in an equipment for controlling the operation of the equipment, and more particularly to such a microcomputer-based control device having a non-volatile memory into which data stored in the device is transferred to be stored.

2. Description of the prior art

In the microcomputer-based control device of the above-described type, an internally stored data such as data of a cumulative operation time period is written into a non-volatile memory at predetermined intervals in order that the data is preserved even in the occurrence of a service interruption or any other kind of interruption to a power source. Alternatively, the data is written into the non-volatile memory every time the control device is deenergized, whereby the data protection is provided.

On the other hand, an air conditioning equipment such as air cleaners which is one of the equipment controlled by a microcomputer employs methods of detecting a time of replacement of a replaceable air filter used in it. For example, in one of such methods, the color of the air filter in use is visually compared with a reference color by a user and the time of replacement of the air filter is determined to come when the user judges that the color of the air filter has changed to be tinged with the reference color. However, in this method, the user needs to visually check the color of the air filter frequently, which is troublesome. Furthermore, it is difficult for the user to make a proper judgment since the judgment relies upon delicate difference between the colors.

In order to overcome the above-described disadvantage of the air conditioning equipment, an arrangement has been proposed wherein an air-conditioning operation time period of the air conditioner is cumulatively counted and the time of replacement of the air filter is determined when the cumulative operation time period has reached a predetermined time period. In this case, too, data of the cumulative air-conditioning operation time period is written into the non-volatile memory at predetermined intervals in order that the data is preserved even in the occurrence of a service interruption or any other kind of interruption to a power source, or the data is written into the non-volatile memory every time the control device is deenergized.

The disappearance of the data due to the service interruption or any other sudden interruption of the power source is not frequent Nevertheless, the data is frequently written into the non-volatile memory when the above-described conventional method is employed for preservation of the data in the microcomputer-based control device. Consequently, the service life of the non-volatile memory is excessively shortened and an expensive long-lived non-volatile memory is required.

In the air conditioners, too, the life of the non-volatile memory is excessively shortened and the expensive long-lived non-volatile memory is required in the same circumference as described above.

SUMMARY OF THE INVENTION

Therefore, an object of the present is to provide a microcomputer-based control device wherein the number of times of writing the data in the non-volatile memory can be reduced to prevent the life of the non-volatile memory from being shortened.

In one aspect, the present invention provides a microcomputer-based control device comprising a DC power supply section connected to an AC power supply section for converting an AC voltage from the AC power supply section to a DC voltage, a control unit connected to the DC power supply and including a microcomputer, a control unit resetting circuit provided between the control unit and the DC power supply for delivering an initial reset signal to the control unit when a voltage to be supplied to the control unit from the DC power supply section has risen to a value at which the control unit is operable, an operation section connected to the control unit for setting an operating condition of the control unit, a non-volatile memory connected to the control unit so that data stored in the control unit is written into and read out of the non-volatile memory, and voltage drop detecting means provided between the control unit and the DC power supply section for detecting the output voltage of the DC power supply section dropped to a predetermined level or below to thereby deliver a data write command signal to the control unit so that the control unit is operated in response to the data write command signal to write the data into the non-volatile memory.

According to the above-described microcomputer-based control device, when the voltage of the DC power supply section drops to the predetermined level or below with drop of the voltage of the AC power supply section, the voltage drop detecting means detects the drop of the DC power supply voltage, thereby delivering the detection signal to the control unit. Upon receipt of the detection signal, the control unit operates to write the internal data into the non-volatile memory. Consequently, the data in the control unit is stored in the non-volatile memory before the voltage supplied from the AC power supply section is completely absent. Thus, the data can be preserved or prevented from disappearing.

Furthermore, the data is written into the non-volatile memory only when the DC power supply voltage drops, the number of times of writing the data into the non-volatile memory is reduced to a large extent. Consequently, the life of the non-volatile memory can be prevented from being shortened.

In another aspect, the present invention provides a microcomputer-based control device incorporated in an air conditioning equipment to which a replaceable air filter is attached, the device comprising a DC power supply section connected to an AC power supply section for converting an AC voltage from the AC power supply section to a DC voltage, an air-conditioning control unit connected to the DC power supply and including a microcomputer, a control unit resetting circuit provided between the air-conditioning control unit and the DC power supply for delivering an initial reset signal to the air-conditioning control unit when a voltage to be supplied to the air-conditioning control unit from the DC power supply section has risen to a value at which the control unit is operable, an operation section connected to the air-conditioning control unit for setting an operating condition of the control unit, a non-volatile memory connected to the air-conditioning control unit so that data of a cumulative air conditioning operation time period stored in the air-conditioning control unit is written into and read out of the non-volatile memory, display means provided in the air-conditioning control unit for cumulating an air-conditioning operation time period and displaying an image indicative of a replacing time of the air filter when the cumulated air-conditioning operation time period has reached a predetermined time period, and voltage drop detecting means provided between the air-conditioning control unit and the DC power supply section for detecting the output voltage of the DC power supply section dropped to a predetermined level or below to thereby deliver a data write command signal to the air-conditioning control unit so that the air-conditioning control unit is operated in response to the data write command signal to write the data into the non-volatile memory.

According to the above-described microcomputer-based control device, when the voltage of the DC power supply section drops to the predetermined level or below with drop of the voltage of the AC power supply section, the drop of the DC power supply voltage is detected by the voltage drop detecting means, thereby delivering the detection signal to the air conditioning control unit. Upon receipt of the detection signal, the air-conditioning control unit operates to write the internal data of the cumulative air-conditioning operation time period into the non-volatile memory. Consequently, the data of the cumulative air-conditioning operation time period in the air-conditioning control unit is stored in the non-volatile memory when the voltage supplied from the AC power supply section is completely absent. Thus, the data can be preserved or prevented from disappearing.

Furthermore, the data is written into the non-volatile memory only when the DC power supply voltage drops, the number of times of writing the data into the non-volatile memory is reduced to a large extent Consequently, the life of the non-volatile memory can be prevented from being shortened.

The air-conditioning control unit operates the display means so that the image indicative of the replacing time of the air filter when the cumulated air-conditioning operation time period has reached the predetermined time period.

Other objects of the present invention will become obvious upon understanding of the illustrative embodiments about to be described. Various advantages not referred to herein will occur to those skilled in the art upon employment of the invention in practice.

BRIEF DESCRIPTION OF THE DRAWINGS

Embodiments of the present invention will be described with reference to the accompanying drawings in which.

DESCRIPTION OF THE PREFERRED EMBODIMENTS

Figure 1:
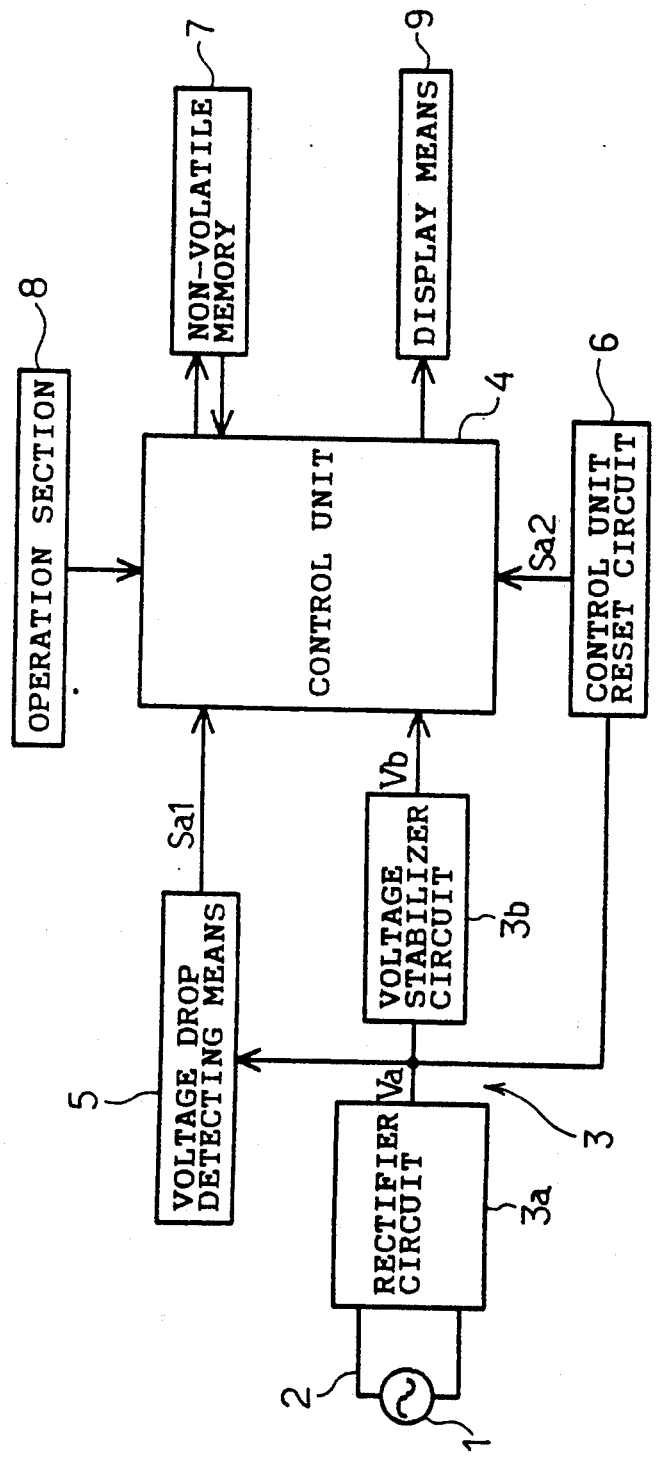
FIG. 1 is a block diagram of a system showing a first embodiment of the present invention.
Figure 2:
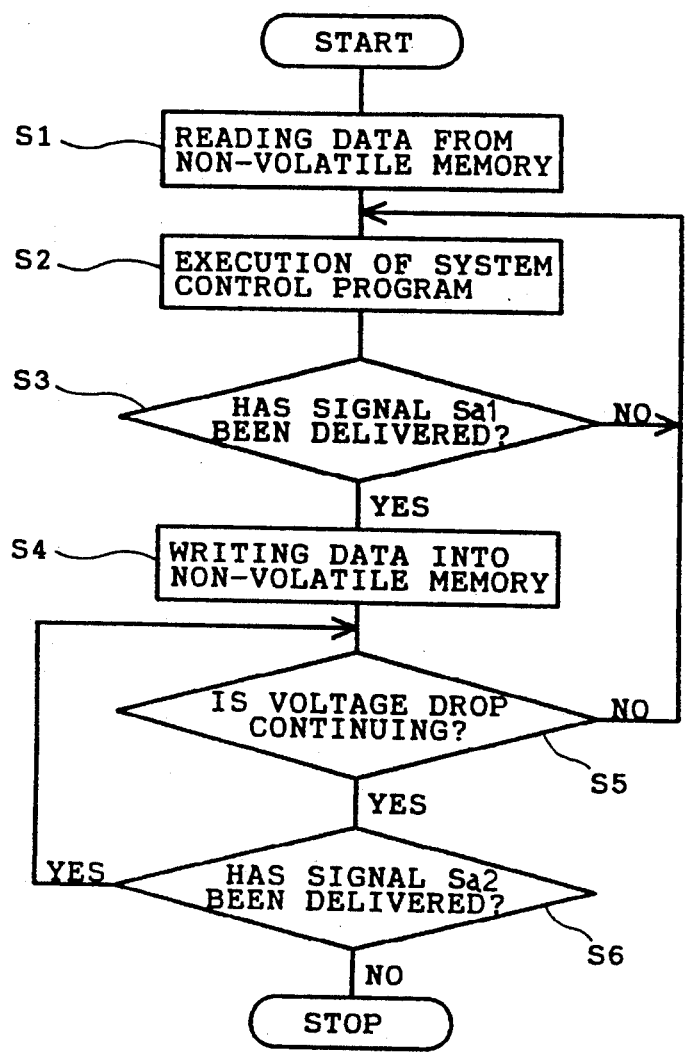
FIG. 2 is a flowchart explaining the operation of the system.
Figure 3:
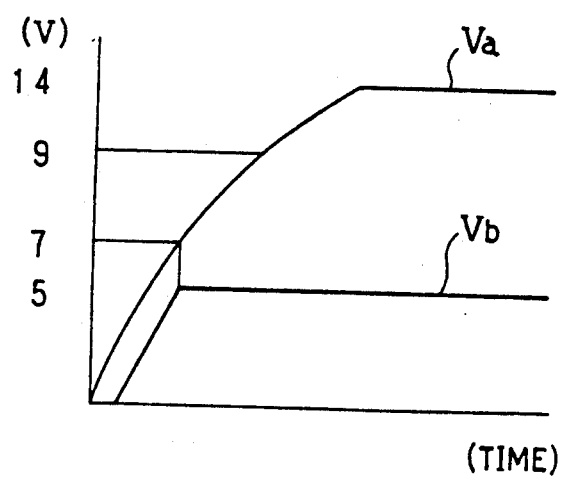
FIG. 3 is a graph showing a voltage characteristic of a DC power supply section in the system.

A first embodiment of the invention will now be described with reference to FIGS. 1–3. Referring to FIG. 1, an AC power supply section 1 supplying a rated voltage such as a commercial AC voltage of 100 V is connected through a bus 2 to a DC power supply section 3. The DC power supply section 3 comprises a rectifier circuit 3a converting the AC voltage of 100 V to a DC voltage and a well-known voltage stabilizer circuit 3b converting the DC voltage from the rectifier circuit 3a to a constant DC voltage V5 of 5 volts, at which value a control unit 4 including a microcomputer normally operates.

Voltage drop detecting means 5 is supplied with a primary DC voltage from the DC power supply section 3 or an input voltage $V_a$ of the voltage stabilizer circuit 3b. The voltage drop detecting means 5 detects the input voltage $V_a$ taking a predetermined value V9 of 9 volts or below. Upon detection of the input voltage taking the value V9 of 9 volts or below, the voltage drop detecting means 5 delivers a voltage drop detection signal Sa1 as a data write command signal to the control unit 4.

A control unit reset circuit 6 is also supplied with the primary DC voltage $V_a$ from the DC power supply section 3. The control unit reset circuit 6 delivers a command signal Sa2 as an initial reset signal to the control unit 4 for initiation of its operation when the input voltage $V_a$ is lower than the voltage V9 at which the voltage drop detection signal Sa1 is delivered and has reached a voltage V7 of 7 volts sufficient for reaching the constant voltage $V_b$ of 5 volts suitable for the control unit 4 operating normally.

A non-volatile memory 7 is connected to the control unit 4. Data of a cumulative operating time period internally stored in the control unit 4, for example, is written into the non-volatile memory 7 and the written data is read out in case of need. The data stored in the non-volatile memory 7 is preserved even when the non-volatile memory 7 is disconnected from the power supply.

An operation section 8 is provided for supplying to the control unit 4 commands of on-off control of a power supply switch, a controlled variable and the like. The operation section 8 is connected to the control unit 4. Display means 9 is also connected to the control unit 4 so that a user can visually determines as to whether the control unit 9 is operating or not.

The operation of the microcomputer-based control device thus arranged will now be described. When the DC power supply section 3 is connected to the AC power supply section 1 supplying the AC voltage of 100 V, the following occurs between START and step S1 in FIG. 2. FIG. 3 shows a voltage characteristic of the DC power supply section 3. The axis of ordinates represents voltage and the axis of abscissas represents time in FIG. 3. As understood from FIG. 3, the above-mentioned first output voltage or the primary DC voltage $V_a$ in the DC power supply section 3 is gradually raised. When the primary DC voltage $V_a$ exceeds the value of 7 volts, the constant DC voltage of 5 volts or the secondary DC voltage $V_b$ is supplied from the DC power supply section 3 to the control unit 4 and simultaneously, the control unit reset circuit 6 delivers the signal Sa2 to the control unit 4 so that the operation of the control unit 4 is initiated.

The primary DC voltage $V_a$ is further raised to exceed the voltage V9 of 9 volts at which value the voltage drop detecting means 5 determines the voltage drop. The primary DC voltage $V_a$ is then stabilized at 14 volts. In this while, the voltage drop detection signal Sa1 is not generated by the voltage drop detecting circuit 5. The reason for this is that the voltage drop detecting circuit 5 is arranged to deliver the voltage drop detection signal Sa1 to the control unit 4 only when the primary DC voltage $V_a$ drops from the value of 9 volts or above to the value of 9 volts or below.

The data of the cumulative operating time period of the control unit 4, for example, is read out from the non-volatile memory 7, at step S1. However, since no data is stored in the non-volatile memory 7 when the control unit 4 is operated for the first time, the control device advances to step S2 with initial data. At step S2, a system control program whose data is stored in a read-only-memory (ROM) of the microcomputer incorporated in the control unit 4 is executed. When the power supply from the AC power supply section 1 to the DC power supply section 3 is interrupted by occurrence of service interruption or an inadvertent disconnection of the plug from the plug socket, such an interruption is indirectly detected in step S3. The detection of the interruption is achieved by the voltage drop detecting means 5 monitoring the output of the primary DC voltage $V_a$ of the DC power supply section 3.

Steps S2 and S3 are looped when no change occurs in the power supply or when the primary DC voltage $V_a$ is maintained at the reference value of 9 volts or above even after occurrence of a slight change in the power supply. When one of switches in the operation section 8 is turned on while the control unit 4 is in the loop of steps S2 and S3, this "on" signal is supplied to the control unit 4. In response to the signal, the control unit 4 continues to deliver to the display means 9 a signal indicating that the control unit 4 is normally operating. However, this signal delivered to the display means 9 need not be a particular signal indicating that the control unit 4 is normally operating. For example, the signal indicative of the capacity of a fan such as INTENSE, MEDIUM or WEAK may be used to indicate that the control unit 4 is operating.

When the primary DC voltage $V_a$ drops to the reference voltage value of 9 volts or below in some cause or other, this drop of the primary DC voltage $V_a$ is detected by the voltage drop detecting means 5, which delivers the voltage drop detection signal Sa1 to the control unit 4.

In step S4, the control unit 4 receives the voltage drop detection signal Sa1. In response to the signal Sa1, the control unit 4 operates to write into the non-volatile memory 7 the data stored in RAM of the control unit 4 and disappearing upon interruption of the power supply.

It is determined in step S5 whether or not the primary DC voltage $V_a$ is continuously dropping. Steps S5 and S6 are looped until the primary DC voltage $V_a$ drops to the value of 7 volts or below, which value is a minimum value supplying the constant voltage of 5 volts to the control unit 4 or while the control unit reset circuit 6 is delivering the signal Sa2. The control unit reset circuit 6 stops delivering the signal Sa2 when the voltage $V_a$ has dropped to the value of 7 volts or below, whereby the microcomputer-based control device completely stops its operation.

As described above, the voltage drop detecting means 5 is provided for detecting the voltage drop in the DC power supply section 3. The data in the control unit 4 is written into the non-volatile memory 7 to be stored only when the control unit 4 receives the voltage drop detection signal Sa1 from the voltage drop detecting means 5. Accordingly, the data can be prevented from disappearing in the occurrence of the service interruption and the frequency of write of the data into the non-volatile memory 7 can be reduced to a large extent. Consequently, the service life of the non-volatile memory can be prevented from being uselessly shortened, which does not necessitate the use of an expensive non-volatile memory and prevents the rise of the production cost of the control device.

The detection value on which the voltage drop is detected is set at the value V9 higher than the voltage V7 which is the minimum value necessary for supply of the constant voltage from the DC power supply section 3 to the control unit 4. Accordingly, the control unit 4 has enough time and is supplied with enough power to write the data into the non-volatile memory 7 even when the power supply is to be interrupted. Consequently, the data can be reliably stored in the non-volatile memory 7. Furthermore, the display means provides an easy visual confirmation of the normal operation of the control unit 4.

Although the voltage drop detecting means and the control unit reset circuit are connected between the DC power supply section and the control unit in the foregoing embodiment, they may be provided in the same circuit as of the DC power supply section.

Figure 4:
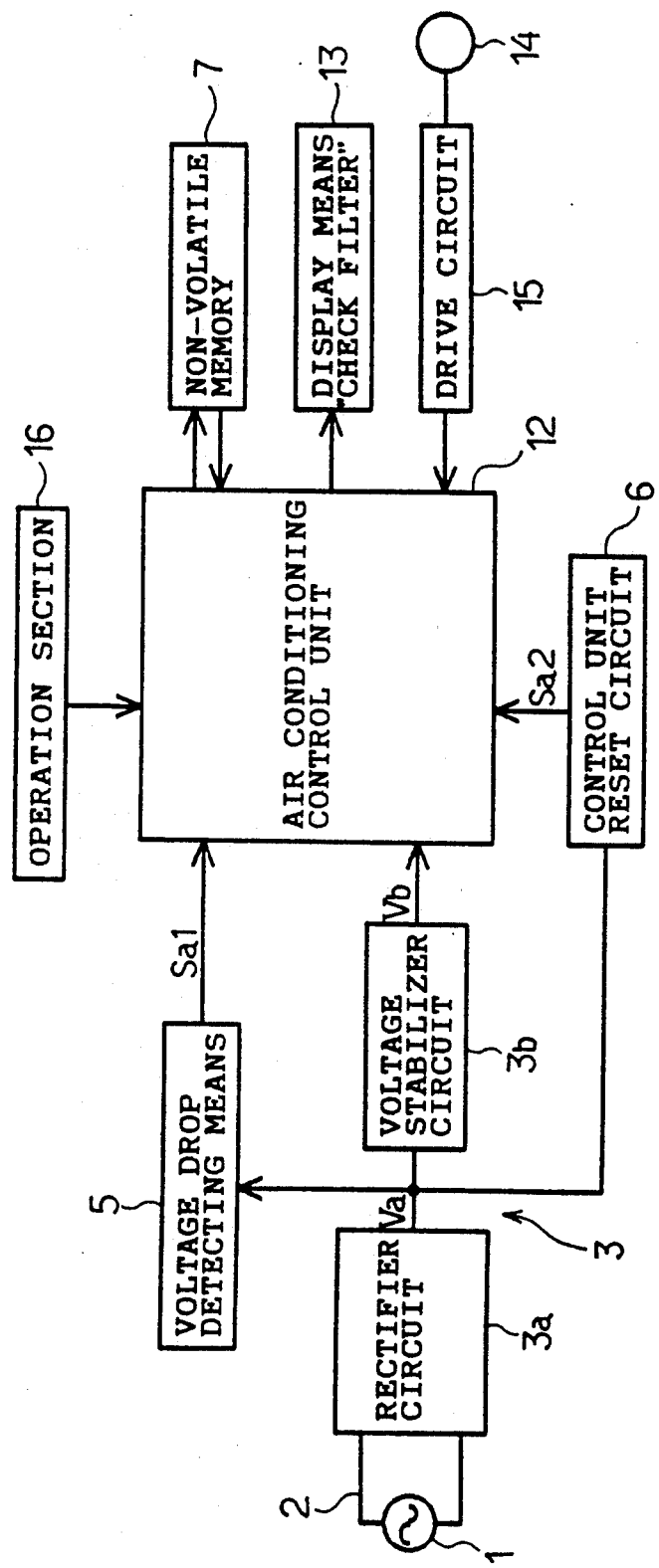
FIG. 4 is a view similar to FIG. 1 showing a second embodiment of the invention.
Figure 5:
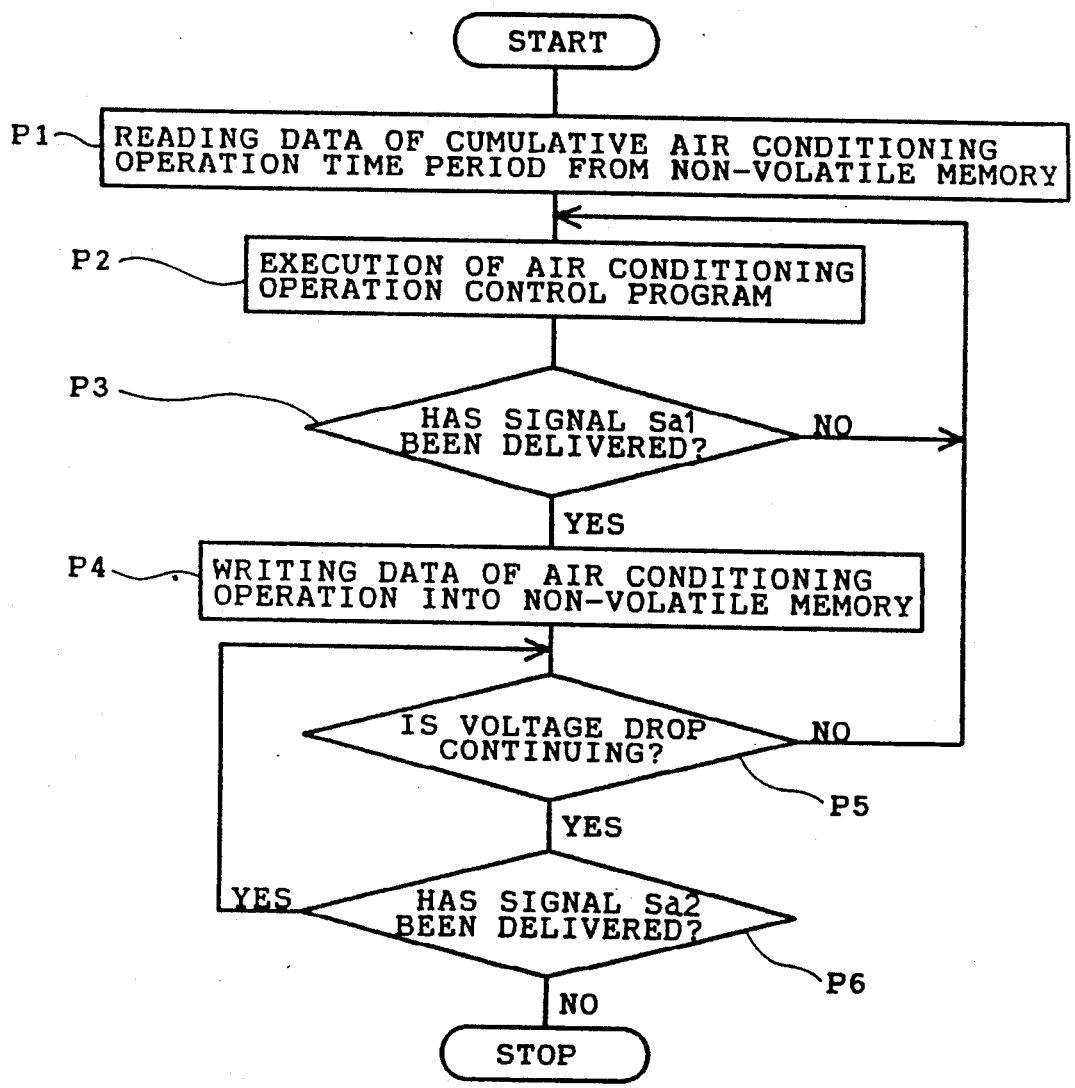
FIG. 5 is a view similar to FIG. 2 showing the second embodiment.

FIGS. 4 and 5 illustrate a second embodiment of the invention. The microcomputer-based control device is applied to an air conditioning equipment in the second embodiment. Referring to FIG. 5, an air conditioning control unit 12 is provided instead of the control unit 4 in the foregoing embodiment. An operation program for controlling the air conditioning operation is previously stored in the air conditioning control unit 12.

The non-volatile memory 7 is connected to the air conditioning control unit 12. Data of a cumulative operating time period internally stored in the unit 12, for example, is written into the non-volatile memory 7 and the written data is read out in case of need. The data stored in the non-volatile memory 7 is preserved even when the non-volatile memory 7 is disconnected from the power supply.

An operation section 16 is provided for supplying to the air conditioning control unit 12 commands of on-off control of a power supply switch, a controlled variable and the like. The operation section 16 is connected to the air conditioning control unit 12. Display means 13 also connected to the air conditioning control unit 12 is provided for displaying an operational mode of the air conditioning control unit 12, for example, by activating a light-emitting-diode (LED) or for displaying characters such as "CHECK FILTER" when the time for replacement of replaceable air filter (not shown) has come, so that the user can visually determine the time for replacement of the air filter.

A fan motor 14 is connected through a drive circuit 15 to the air conditioning control unit 12. The fan motor 14 is driven in accordance with a control signal from the air conditioning control unit 12 to induce an air flow so that a filthy air is filtrated through an air filter.

The operation of the microcomputer-based control device applied to the air conditioning equipment will be described. When supplied with the AC voltage of 100 volts from the AC power supply section 1, the DC power supply section 3 converts the supplied AC voltage to the DC voltage to deliver it. Then, the primary output voltage $V_a$ of the DC power supply section 3 is gradually raised. When the primary output voltage $V_a$ exceeds the voltage V7 of 7 volts, the secondary output voltage $V_b$ of 5 volts is supplied to the air conditioning control unit 12 and simultaneously, the control unit reset circuit 6 delivers the command signal Sa2 to the air conditioning control unit 12 for initiation of its operation.

The primary DC voltage $V_a$ is further raised to exceed the voltage V9 of 9 volts which value is determined to be a low voltage by the voltage drop detecting means 5. The primary DC voltage $V_a$ is then stabilized at 14 volts. In this while, the voltage drop detection signal Sa1 is not generated by the voltage drop detecting circuit 5.

When supplied with the electrical power as described above, the air conditioning control unit 12 executes the program as shown in FIG. 4. The air conditioning control unit 12 reads the data of the cumulative air conditioning operation time period stored in the non-volatile memory 7 at step P1. The cumulative air conditioning operation time period refers to a cumulative time period of the air conditioning operation performed by the air conditioning control unit 12. Since no data is stored in the non-volatile memory 7 when the air conditioning control unit 12 is to be operated for the first time, the control device advances to step P2 with initial data. At step P2, an air conditioning operation control program whose data is stored in ROM of the microcomputer incorporated in the control unit 4 is executed. In the execution of the program, the fan motor 14 is driven through the drive circuit 15 in accordance with the control signal supplied thereto from the air conditioning control unit 12, whereby the filthy air is sucked to be caused to pass through the air filter for the filtration and then exhausted.

The air conditioning control unit 12 counts the period of time for which the air conditioning operation is performed, and stores the data of the cumulative air conditioning operation time period in the internal memory such as RAM. The air conditioning control unit 12 delivers to the display means 13 a display signal indicative of the time for the replacement of the air filter when the value indicated by the data of the cumulative air conditioning operation time period reaches a predetermined value corresponding to the time for replacement of the air filter, for example, 1,500 hours. Consequently, characters of CHECK FILTER are displayed on the display 13, for example.

When the power supply from the AC power supply section 1 to the DC power supply section 3 is interrupted by occurrence of service interruption or an inadvertent disconnection of the plug from the plug socket, such an interruption is indirectly detected in step P3. The detection of the interruption is achieved by the voltage drop detecting means 5 monitoring the output of the primary DC voltage $V_a$ of the DC power supply section 3.

Steps P2 and P3 are looped when no change occurs in the power supply or when the primary DC voltage $V_a$ is maintained at the reference value of 9 volts or above even after occurrence of slight change in the power supply. When one of the switches in the operation section 16 is turned on while the control device is in the loop of steps P2 and P3, this "on" signal is supplied to the air conditioning control unit 12. In response to the signal, the air conditioning control unit 12 continues to deliver to the display means 13 a signal indicating that the control unit is normally operating. Furthermore, the mode of the air conditioning operation is displayed on the display 13 in accordance with the display signal from the air conditioning control unit 12 or the signal indicative of the capacity of a fan such as INTENSE, MEDIUM or WEAK.

The air conditioning control unit 12 determines whether or not the voltage drop detection signal Sa1 has been delivered by the voltage drop detecting means 5, at step P3. In this case, when the primary DC voltage $V_a$ drops to the reference voltage value of 9 volts or below in some cause or other, this drop of the primary DC voltage $V_a$ is detected by the voltage drop detecting means 5, which delivers the voltage drop detection signal Sa1 to the air conditioning control unit 12. The determination of the air conditioning control unit 12 is based on the delivered voltage drop detection signal Sa1.

When the voltage drop detection signal Sa1 has been input, the air conditioning control unit 12 determines in the affirmative at step P3 and advances to step P4 where the data of the cumulative air conditioning operation time period stored in RAM is written into the non-volatile memory 7. Then, the air conditioning control unit 12 advances to step P5.

On the other hand, when the voltage drop detection signal Sa1 has not been input from the voltage drop detecting means 5, the air conditioning control unit 12 determines in the negative at step P3 and then returns to step P2.

It is determined in step P5 whether or not the primary DC voltage $V_a$ is continuously dropping. Steps P5 and P6 are looped until the primary DC voltage $V_a$ drops to the value of 7 volts or below, which value is a minimum value for supplying the constant voltage of 5 volts to the air conditioning control unit 12 or while the control unit reset circuit 6 is delivering the signal Sa2. The control unit reset circuit 6 stops delivering the signal Sa2 when the voltage $V_a$ has dropped to the value of 7 volts or below, whereby the microcomputer-based control device completely stops its operation. In this state, the non-volatile memory 7 stores the data of the cumulative air conditioning operation time period previously stored in RAM based on the counting operation of the air conditioning control unit 12 immediately before the interruption of the power supply. Thereafter, when the power supply is put to work to restart the operation, the data stored in the non-volatile memory 7 is read into the air conditioning control unit 12 as described above at step P1. Consequently, the data of a correct cumulative air conditioning operation time period can be stored regardless of the occurrence of the interruption of the power supply.

The foregoing disclosure and drawings are merely illustrative of the principles of the present invention and are not to be interpreted in a limiting sense. The only limitation is to be determined from the scope of the appended claims.

I claim:

1. A microcomputer-based control device comprising:
   a) a DC power supply section connected to an AC power supply section for converting an AC voltage from the AC power supply section to a DC voltage;

b) a control unit connected to the DC power supply and including a microcomputer;

c) a control unit resetting circuit provided between the control unit and the DC power supply for delivering an initial reset signal to the control unit when a voltage to be supplied to the control unit from the DC power supply section has risen to a value at which the control unit is operable;

d) an operation section connected to the control unit for setting an operating condition of the control unit;

e) a non-volatile memory connected to the control unit so that data stored in the control unit is written into and read out of the non-volatile memory; and f) voltage drop detecting means provided between the control unit and the DC power supply section for detecting the output voltage of the DC power supply section dropped to a predetermined level or below to thereby deliver a data write command signal to the control unit so that the control unit is operated in response to the data write command signal to write the data into the non-volatile memory.

2. A microcomputer-based control device incorporated in an air conditioning equipment to which a replaceable air filter is attached, the device comprising:

a) a DC power supply section connected to an AC power supply section for converting an AC voltage from the AC power supply section to a DC voltage;

b) an air-conditioning control unit connected to the DC power supply and including a microcomputer;

c) a control unit resetting circuit provided between the air-conditioning control unit and the DC power supply for delivering an initial reset signal to the air-conditioning control unit when a voltage to be supplied to the air-conditioning control unit from the DC power supply section has risen to a value at which the control unit is operable;

d) an operation section connected to the air-conditioning control unit for setting an operating condition of the control unit;

e) a non-volatile memory connected to the air-conditioning control unit so that data of a cumulative air conditioning operation time period stored in the air-conditioning control unit is written into and read out of the non-volatile memory;

f) display means provided in the air-conditioning control unit for cumulating an air-conditioning operation time period and displaying an image indicative of a replacing time of the air filter when the cumulated air-conditioning operation time period has reached a predetermined time period; and g) voltage drop detecting means provided between the air-conditioning control unit and the DC power supply section for detecting the output voltage of the DC power supply section dropped to a predetermined level or below to thereby deliver a data write command signal to the air-conditioning control unit so that the air-conditioning control unit is operated in response to the data write command signal to write the data into the non-volatile memory.

* * * * *